J. THOMSON.
METHOD AND MEANS FOR PRODUCING OXIDE OF ZINC.
APPLICATION FILED MAY 5, 1921.
1,425,918.  Patented Aug. 15, 1922.
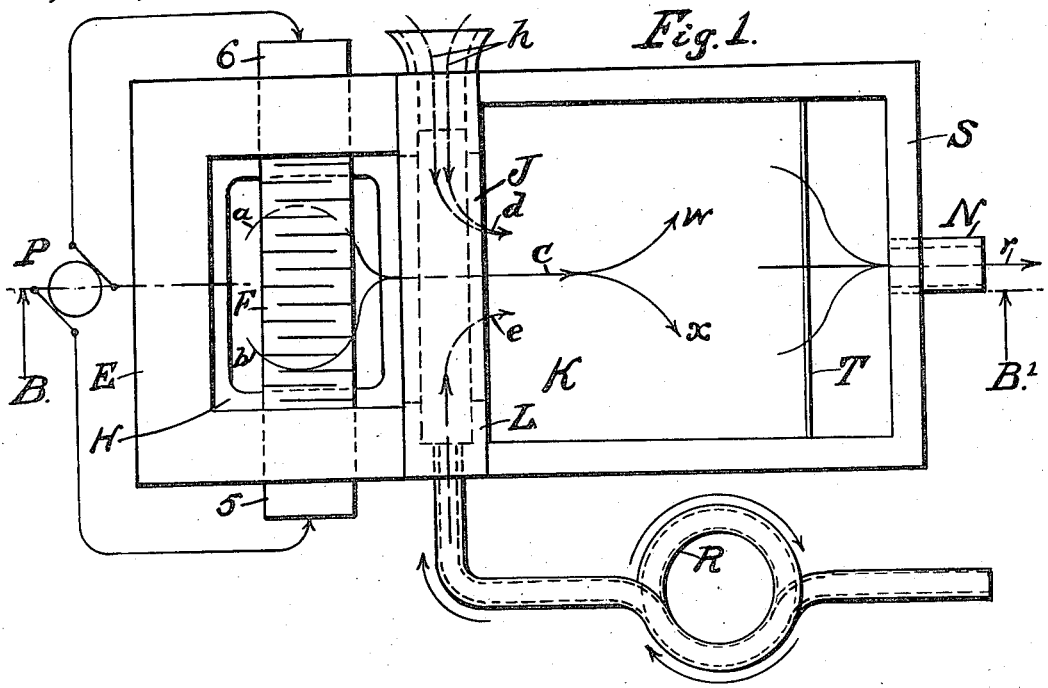
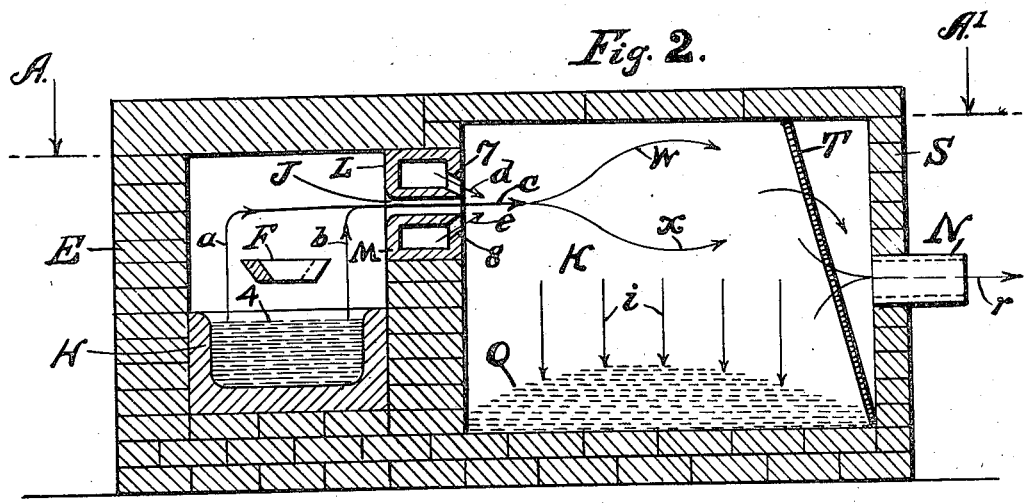
Inventor:
John Thomson.

UNITED STATES PATENT OFFICE.

JOHN THOMSON, OF BROOKLYN, NEW YORK.

METHOD AND MEANS FOR PRODUCING OXIDE OF ZINC.

1,425,918.    Specification of Letters Patent.    Patented Aug. 15, 1922.

Application filed May 5, 1921. Serial No. 466,866.

*To all whom it may concern:*

Be it known that I, JOHN THOMSON, a citizen of the United States, and a resident of the borough of Brooklyn, city and State of New York, have invented a Method and Means for Producing Oxide of Zinc, of which the following is a specification.

The method and means of this invention broadly relates to the metallurgy of zinc, but particularly pertains to the production of oxide-of-zinc derived from the re-distillation of metallic zinc, which, in its gaseous form, is then completely oxidized; and the object thereof is to economically produce an oxide-of-zinc whose physical characteristic is advantageously utilizable in the art.

As the subject-matter hereof bears a complementary relationship to applicant's application of March 16th, 1921, Serial No. 452,041, same title, it is deemed needless to again recite the academic data therein set forth.

The essence hereof, which is comprised in the method and means to be hereinafter more fully elucidated, may be briefly summarized as follows:

To produce, in an electric furnace, by re-distillation of metallic zinc, substantially pure, isolated zinc-fume, or zinc-gas; to considerably, or nominally, super-heat the said fume within the said furnace; to pass the said fume into a separate, continguous chamber; to supply said chamber either with pre-heated atmospheric air, or air mixed with generated oxygen, whereby to effect, as a resultant of the sum of the two temperatures, the classical reaction $(Zn+O=ZnO)$ but at such a thermal intensity that the physical characteristic of the resulting oxide is crystalline; and to precipitate, or recover, the said product in the aforesaid chamber.

When applicant's cited application was filed, the fact, as such, was existent but its cognition had not become apparent, that, when zinc-gas is considerably super-heated, say to about 1,200° to 1,300° C., and is commingled with pure generated oxygen, or oxygen which has been partially depotentiated by an admixture of air, either or both being at normal temperatures, the intensity of the reaction is sufficient to produce an oxide-of-zinc whose physical characteristic is crystalline.

On the other hand, when zinc-gas, at or about its normal temperature of free evolution (as from a crucible) is oxidized by air and the latter is at or about its normal atmospheric temperature, the resulting physical characteristic of the oxide is amorphous.

And it has been ascertained that, whilst the apparent comminution of the crystalline particles, which are in themselves an agglomeration derived from, so to speak, "atomic-dust," may be no finer, or even coarser, than the amorphous particles, the crystalline oxide imparts to rubber a substantial enhancement of tensile strength and of elasticity, or "stretch;" it also "works" better when being embedded in rubber, as by means of rollers, that is not tending, as does amorphous oxide, to cake or "ball-up."

In tests for pigment utilization, the extreme porosity of crystalline oxide has been well disclosed, in that its oil-absorption may be fully twice as great as in the case of the highest standard of amphorous oxide. All of this is devoid of mystery; for, when microscopically resolved, the crystals are snowlike in appearance and kaleidoscopic in variety.

Therefore, the fixation of these important data, of signal advantage in the art, lead to the present method and selection of means for a practical realization thereof by the utilization of air alone, or of air whose potentiality has been augmented by a minor content of generated oxygen, when either or both thereof are pre-heated before being brought into physical contact with zinc-gas.

In the drawings, which constitute a part of this specification but have been purposely prepared merely to visualize preferred means for realizing this method, Figure 1 is a plan view of a preferred type of electric furnace and a co-ordinating precipitating chamber, whose covers are removed, taken along the planes A, $A^1$ of Figure 2; and Figure 2 is a vertical longitudinal section, as along the center line B and plane $B^1$ of Figure 1.

The furnace element here denoted, E, is of the resistance type in which heat is developed by a monolithic zig-zag resistor F, suspended above a tank H, which contains molten zinc 4. The said resistor may be so formed, as is indicated in Figure 2, that its lower surface has a higher current-density, and a correspondingly higher temperature, than its upper surface. Its terminals 5, 6, are connected in a power circuit, symbolically denoted by P.

When fume is generated, at the surface of the bath, it flows upwardly, primarily impinging upon and passing around the hotter surfaces of the resistor, as see arrows $a$, $b$, and is thereby superheated and expanded.

In this type of resistor, its temperature is readily maintainable within a normal plus and minus tolerance; consequently the extent of superheat imparted to the zinc-gas can be held at whatever is best adapted for the purpose.

The zinc-gas is caused to preferably pass out of the furnace through a long, narrow port, J, whereby to deliver a thin ribbon-like stream into the precipitating chamber, K, as see arrow $c$.

Built into and forming a part of the right-hand wall of the furnace are two refractory tubes, one of which, L, forms the upper boundary of the port, whilst the other, M, forms the lower boundary. These tubes are provided with slits, 7, 8, so located that an out-flow therefrom shall converge one towards the other of them, as see arrows $d$, $e$, Figure 2. These tubes are for the purpose of furnishing atmospheric air, or air containing a minor admixture of generated oxygen. Hence, the out-flowing air, or air and oxygen, completely "blanket" the zinc-gas at the instant of its in-flow to the primary reaction zone of the chamber.

At the right-hand end of the precipitating chamber, a transverse screen, or porous blanket, T, is disposed; and a tube, N, is located in the end wall, S, connected to suitable means, not shown, for creating some definitely maintainable amount of suction in the direction denoted by arrow $r$.

The arrows $i$ denote the precipitation of the oxide, O, on the floor of the chamber, which may be manually extracted through side-openings, or dumped into an underlying bin, not shown.

When suction is produced at the end-tube, N, this effect will extend to the fume-port, and also to the upper and lower embracing slits, simultaneously sucking out zinc-gas, from the furnace, and air, or air and oxygen, from the tubes. As shown in the drawings, the cross-sectional areas of the bores of these tubes are considerably greater than that of the slits, whereby the longitudinal rate of flow will be much slower than the transverse rate of delivery into the chamber; and, as the tube-walls may be quite thin, the more slowly moving air, or air and oxygen, can be considerably pre-heated, prior to issuing from the slits, by heat derived from the fuming furnace. Thus, if a moderate rise in temperature is adequate, which will more or less depend upon the extent of super-heat imparted to the zinc-gas, and if air alone is used, it may be drawn direct from the furnace-room, as denoted by arrows $h$; but if a considerable rise in temperature is required, and if some admixture of generated oxygen is desirable, then either or both may be passed through extraneous means for imparting the requisite heat as, for example, a coil of metal pipe, as R, which may be bedded in a coke-fire or acted upon by an oil or gas-flame. So, too, one of the tubes may be supplied with air whilst the other is supplied with generated oxygen, in such relative proportions as may be desired.

Right here, it is important to bear in mind that approximately four-fifths of all the air which may be drawn, or driven, into the precipitating chamber, through the tubes, is inert nitrogen; and that it serves to extract heat both from the zinc-gas and also from the oxide. Consequently, with a given temperature of zinc-gas and a given temperature of the oxidizing medium, the mean resultant of the two temperatures can be such that the intensity of the reaction (Zn+O= ZnO) will produce an oxide whose physical characteristic is wholly amorphous; but with another given co-ordinating set of temperatures the mean resultant thereof can be such that the physical characteristic of the oxide will be wholly crystalline.

As is well known, low to moderately high temperatures can usually be less expensively imparted to a substance by fuel-heat, whilst from moderately high, to high and very high temperatures, the economic advantage is distinctly derivable from electric energy. Consequently, in usual practice, it is probable that the pre-heating of the oxidizing element can be most economically effected by fuel-heat extraneous to the furnace.

By imparting a temperature to zinc-gas of, say, 1,200° to 1,300° C., the use of pure cold oxygen, or partially depotentiated oxygen, will effect a sufficiently intense reaction to produce a crystalline oxide; but if air alone is used, or air with a minor admixture of generated oxygen, the zinc-gas would require to be super-heated to such a considerably higher temperature, because of the large volume of inert nitrogen to be dealt with, as would probably entail grave difficulties with refractories and various structural details.

A proper maneuvering of the means herein described and depicted, but according to the method hereof, will result according to whatever end may be desired; for example, to produce any of the following products:

With moderately super-heated zinc-gas, say 1,050° to 1,100° C.; with air somewhat enriched by generated oxygen, say 15 to 25 per centum, and with the said admixture of air and oxygen moderately preheated, say to 250° to 350° C., crystalline oxide-of-zinc.

With a more highly super-heated zinc-gas and a lesser temperature of oxidizing gases, crystalline oxide-of-zinc.

With a more moderately super-heated zinc-gas and air alone to which a considerably higher temperature has been imparted, crystalline oxide-of-zinc.

By a diminution of the temperature of one, or another, or all of the reacting gases, amorphous oxide-of-zinc; in other words, whose physical characteristics are the same as has hitherto been produced.

Again, it is probable, but this has not as yet been definitely established, that, by employing suitable means for controlling the rapidity of cooling the oxide, the average size of its crystallized particles will correspond thereto, that is to say, following the intense exothermic reaction necessary to effect crystallization, it is deemed likely that the more rapidly it is chilled, after the instant of fixation, the finer will be the degree of comminution—not of the primary "atoms" of formation but of the ensuing, ultimate crystals, whose formation is presumably due to subsequent sublimation of the oxide itself.

As has been pointed out in the applicant's cited application, when pure or nominally depotentiated oxygen is employed, the precipitation of the oxide is effected within a relatively restricted area; but when air alone is used, or air with a minor content of generated oxygen, the volumetric capacity of the precipitating chamber must be greater, and it will then be advantageous to use a screen or blanket, as T, or a nominal bag system, whereby to intercept any floating oxide at the far-end of said chamber whilst permitting a free escape of unutilized and inert gases.

Due to the fact that the out-flowing volume of zinc-gas is completely encompassed with impinging streams of oxidizing gas, a very rapid and complete transmutation thereof to oxide-of-zinc is thus effected within a short distance from the zone of primary impingement. This feature of obtaining a rapid and concentrated zone of reaction is a highly important element of the method, in that the zinc-gas is thus prevented from falling to a temperature when its mist-stage, or fog-stage, would ensue when the precipitant would be in the form of blue-powder. Moreover, in these circumstances, a lesser volume of air will serve.

It may be of passing interest to here observe that the zinc-gas enters the precipitating chamber when the volume thereof is at its greatest; that immediately zinc-gas makes contact with an oxidizing gas, its volume diminishes; but that, owing to the transfer of heat from the hotter to the cooler gas, the unemployed volume of the oxidizing medium increases, as is visualized by the arrows, $w$, $x$.

The means which have been mentioned and depicted may be variously re-disposed, modified or substituted without evasion of the spirit and functioning of the present method; for example, in support of this assertion and to justify several of the following generic claims, a plurality of fume-ports may be formed and two precipitating chambers may be connected, right and left; all of the air, or air and oxygen, need not necessarily be supplied from a single side of the furnace but may be otherwise introduced, as from the roof.

What I claim is:

1. The method of producing oxide-of-zinc, whose physical characteristic is crystalline, by super-heating re-distilled zinc-gas and oxidizing it by means of pre-heated air.

2. The method of producing oxide-of-zinc, whose physical characteristic is crystalline, by super-heating re-distilled zinc-gas and oxidizing it by means of a pre-heated mixture of air and generated oxygen.

3. The method of producing oxide-of-zinc, whose physical characteristic is crystalline, by super-heating re-distilled zinc-gas and oxidizing it by means of a gaseous oxidizing agent, the required intensity of the reaction being a function of the temperatures of the zinc-gas and of the oxidizing gas.

4. The method of producing crystalline oxide-of-zinc, which essentially consists in oxidizing super-heated zinc-gas by air, the zinc-gas being produced by re-distilling metallic zinc in an electric furnace from whence it passes between impinging streams of the oxidizing medium, previously preheated, the resulting product concurrently precipitating in a chamber.

5. The method of producing crystalline oxide-of-zinc, which consists in re-distilling metallic zinc, in an electric furnace, super-heating the zinc-gas, passing said gas to a separate contiguous chamber wherein it is commingled with pre-heated air, the ensuing reaction $(Zn+O=ZnO)$ being a function of the temperatures of the super-heated zinc-gas and of the pre-heated oxidizing medium.

6. The method of producing oxide-of-zinc, which consists in super-heating re-distilled zinc-gas; passing the said gas to a separate, contiguous chamber and commingling therewith pre-heated air, whereby the temperature of the ensuing reaction is sufficiently intense to crystallize the oxide.

7. The method of producing oxide-of-zinc, whose physical characteristic is crystalline, which consists in super-heating re-distilled zinc-gas; passing the said gas to a separate, contiguous chamber and commingling therewith air, either, of which has previously been pre-heated, whereby the intensity of the ensuing reaction is a function of the combined temperatures imparted to the zinc-gas and to the oxidizing element.

8. The method and means for producing crystalline oxide-of-zinc which are comprised in re-distilling zinc and super-heating the evolved gas in an electric furnace and passing the gas to a separate, contiguous chamber which is supplied with pre-heated air, whereby the aforesaid crystalline characteristic results from the combined temperatures previously imparted to the zinc-gas and to the oxidizing element.

9. In the production of oxide-of-zinc, whose resolved structure is crystalline, the method of supplying to evolved zinc-gas the additional temperature necessary to effect crystallization, which consists in heating the oxidizing element prior to its admixture with said zinc-gas.

10. In the production of oxide-of-zinc, whose resolved structure is crystalline, the method of imparting to zinc-gas, evolved in an electric furnace, the additional temperature necessary to effect crystallization, which consists in heating the oxidizing element, prior to its admixture with said zinc-gas, in an extraneous fuel-fired furnace.

This specification signed this 30th day of April A. D. 1921.

JOHN THOMSON.